United States Patent [19]
MacFarland, Jr.

[11] 3,894,282
[45] July 8, 1975

[54] ADAPTIVE TIMING TEMPERATURE CONTROL CIRCUIT

[75] Inventor: Raymond W. MacFarland, Jr., Novelty, Ohio

[73] Assignee: Computron, Inc., Valley View, Ohio

[22] Filed: Feb. 2, 1973

[21] Appl. No.: 328,944

[52] U.S. Cl. .................. 323/4; 219/492; 317/141 S; 323/19
[51] Int. Cl. ........................................... G05d 23/01
[58] Field of Search ...... 307/293; 317/141 S; 323/4, 323/19, 100

[56] References Cited
UNITED STATES PATENTS

| | | | |
|---|---|---|---|
| 3,582,715 | 6/1971 | Traina | 317/141 S |
| 3,600,610 | 8/1971 | Kelsch et al. | 317/141 S |
| 3,794,857 | 2/1974 | Milovancevic | 307/293 |

Primary Examiner—A. D. Pellinen
Attorney, Agent, or Firm—Woodling, Krost, Granger & Rust

[57] ABSTRACT

An adaptive timing temperature control circuit to control power to an output in accordance with the power which was previously delivered to the output during a prior period of time. Output power is furnished to the output circuit while a first capacitor is charged by a constant current generator to terminate the output power when the charge on the first capacitor exceeds a predetermined value. A second capacitor begins to charge when the output power is terminated for storing a charge in relation to the time since the previous output. The second capacitor is connected for controlling the current output of the constant current generator to vary the time required for the first capacitor to exceed the predetermined charge. The circuit compensates for heat build-up in the output without the need of heat sensing devices.

4 Claims, 3 Drawing Figures

ADAPTIVE TIMING TEMPERATURE CONTROL CIRCUIT

BACKGROUND OF THE INVENTION

This invention relates to automatic temperature and humidity regulation and more specifically to automatic temperature regulation with timing elements.

The prior art has known many types of temperature compensating circuits. One important area in the application of temperature control circuits has been in the heat sealing machine art. In such a field, heated jaws are used to heat seal plastic or the like to form containers or bags. In heat sealing machines of the prior art, a heat pulse was applied to a plastic material when heater jaws enclosed the plastic material. This heat pulse was furnished by an electrical current through a heater element such as a Nichrome wire for a short period of time, typically less than one second. These machines of the prior art have experienced the difficulty that the heat pulse to the heater element must be controlled in accordance with the duty cycle of the heater element to compensate for heat build up in the jaws. Many types of devices were used in the prior art in an attempt to regulate the heat pulse to the heater element in accordance with the duty cycle. Most of these devices included a temperature sensor such as a thermocouple or a thermistor to measure the temperature of either the heater element or the heater jaws in an attempt to develop a signal to compensate and to control the next subsequent electrical output to the heater element. The disadvantage of the temperature sensor was soon realized in that these temperature sensors were frequently damaged causing breakdown of the entire apparatus. The response of many of these sensors was too slow to be beneficial.

Therefore, an object of this invention is to produce a temperature control circuit which does not require a temperature sensing device.

Another object of this invention is to produce a temperature control circuit which adapts and controls electrical output to a heater element in accordance with previous duty cycle.

Another object of this invention is to produce a temperature control circuit to compensate for heat build-up in the mounting of a heater element.

Another object of this invention is to produce a temperature control circuit which is reliable yet inexpensive.

SUMMARY OF THE INVENTION

The invention may be incorporated in an adaptive timing temperature control circuit to control output to output means, comprising in combination; power source means, adapted to provide a constant current output at various current magnitudes, means connecting said constant current generator means to said power source means to provide power for said constant current generator means, first switch means having a first and a second state, first capacitor means, means connecting said first switch means and said first capacitor means to change the charge on said first capacitor means with a first magnitude of constant current from said constant current generator means when said first switch means is in said first state, sensor means connected to said first capacitor means to produce an output when said first switch means is in said first state until the change in charge on said first capacitor means exceeds a predetermined value; means connecting said sensor means to the output means to control output thereto in accordance with the output of said sensor means, second capacitor means for storing a charge, means connected to said second capacitor means for discharging said second capacitor means upon termination of the previous output of said sensor means, means connecting said capacitor means to said power source means to change the charge on said second capacitor means with said change in charge in said second capacitor means being in relation to the duration since the previous output of said sensor means, and means connecting said second capacitor means to said constant current generator means to provide a second current magnitude of said constant current generator means to said first capacitor means to vary the time required for said first capacitor means to have a change in charge exceeding said predetermined value whereby the duration of the output to the output means is varied in accordance with the elapsed time since the previous output thereto.

Other objects and a fuller understanding of the invention may be had by referring to the following description and claims, taken in conjunction with the accompanying drawing.

DESCRIPTION OF THE PREFERRED EMBODIMENT

Figure 1:
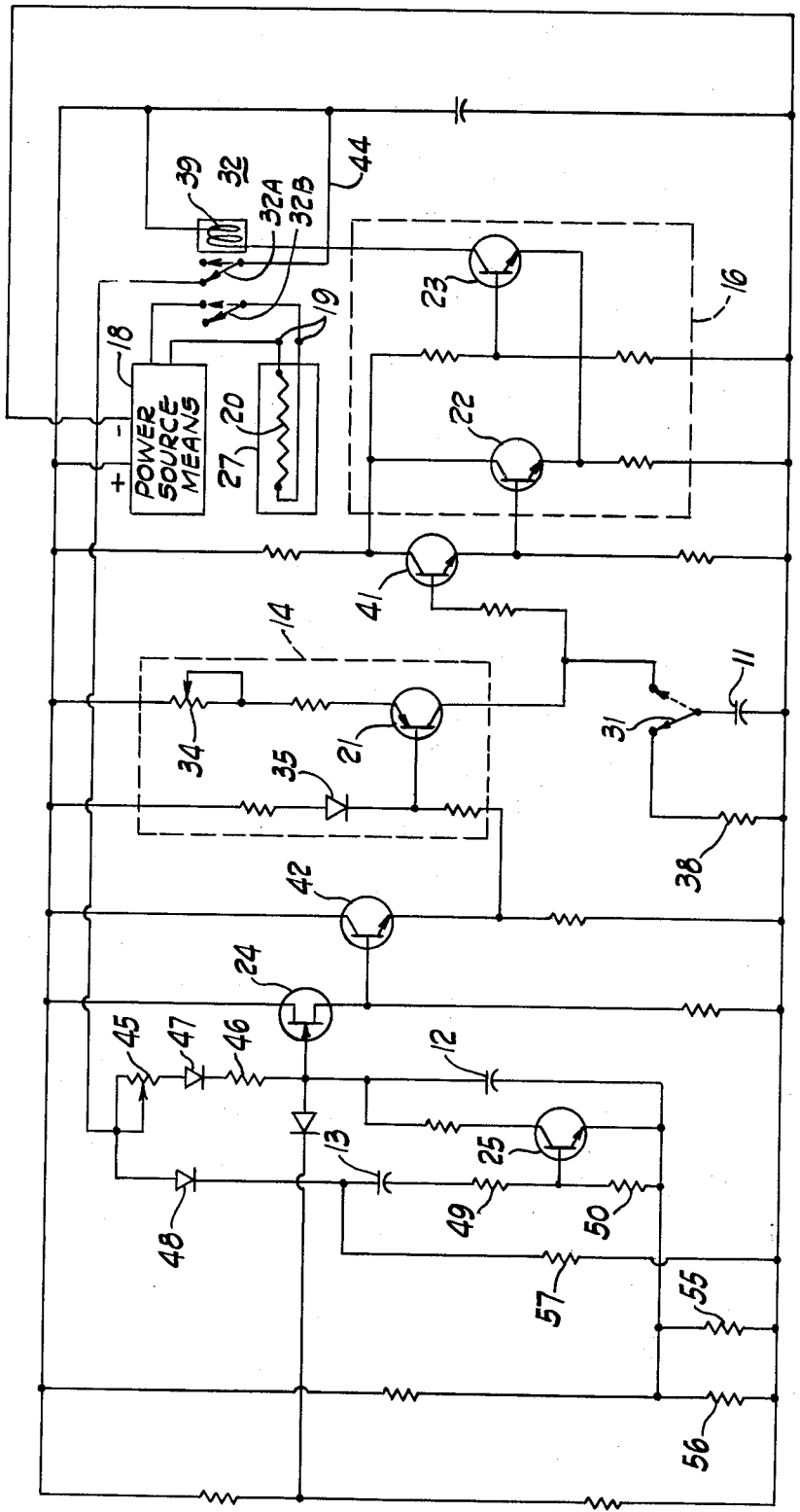
FIG. 1 is a preferred embodiment showing an electrical diagram of an adaptive timing temperature control circuit.

FIG. 1 is the preferred embodiment of the invention showing an adaptive timing temperature control circuit to control output to output means 19. The output means 19 can be connected to a heater element 20 which heater element may be a Nichrome wire or the like. The heater element 20 is shown established in a sealing means 27 which increases in ambient temperature upon output delivered to the heater element 20.

The timing circuit comprises first switch means 31 having a first and second state and which is shown by solid arrows in the second state. The invention comprises first and second capacitor means 11 and 12 and means 14 shown as a constant current generator established to change the charge on the first capacitor 11 when the switch means 31 is in the first position. The second capacitor 12 is connected through a switch 32A of a relay 32 to power source means 18 to change the charge on the second capacitor 12 when the first switch means 31 is in the second state. The invention includes means connecting the second capacitor 12 to the current generator 14 to vary the current output in accordance with the charge on the second capacitor 12. The invention includes means shown as a switch 32B of the relay 32 for controlling power to the output means 19 in accordance with the charge on the first capacitor 11.

The constant current generator 14 comprises a first transistor 21 which is connected to the power source means 18 through a variable resistor 34. The base of the first transistor 21 is connected to the power source means 18 by a diode 35. The output of the constant current generator 21 is connected in series with the first switch means 31 and the first capacitor 11. The first switch means 31 shown in the second position by the solid arrows discharges the capacitor 11 through a resistor 38. When the first switch means 31 is in the second position, the current output of current generator 14 flows through a first amplifier transistor 41 and a second transistor 22. The second transistor 22 is connected to a third transistor 23 to form sensor means 16 which arrangement is commonly referred to as a Schmitt trigger. If transistors 41 and 22 are conducting, then transistor 23 is essentially shut off. The collector circuit of transistor 23 includes a relay coil 39 of the relay 32. The cut-off of transistor 23 de-energizes relay 32 into the position shown by the solid arrows. The switch 32A of relay 32 connects a third capacitor means 13 to the power source means 18 by way of conductor 44 and a diode 48. When switch 32A is first established into the position as shown by the solid arrows, a displacement current flows through capacitor 13 and resistors 49, 50, 55 and 56 to fire a fifth transistor 25 into conduction thereby discharging any charge on capacitor 12. The duration of conduction of transistor 25 is determined by the time constant of capacitor 13 and resistors 49, 50, 55 and 56 which time constant is selected to be in the order of milliseconds in the preferred embodiment. Subsequent to the conduction of transistor 25, the second capacitor 12 begins to recharge through the conductor 44, resistors 45 and 46 and a diode 47. The time constant for the recharging of capacitor 12 is determined by resistors 45, 46, 55 and 56 and capacitor 12 which time constant is selected to be in the order of minutes. The voltage across capacitor 12 is applied to the gate of a fourth transistor 24 which is shown as a field effect transistor. The output of the fourth transistor 24 is coupled through a second amplifying transistor 42 to the base of the first transistor 21. Thus the charge on capacitor 12 influences the output of the constant current generator 14.

Figure 2:
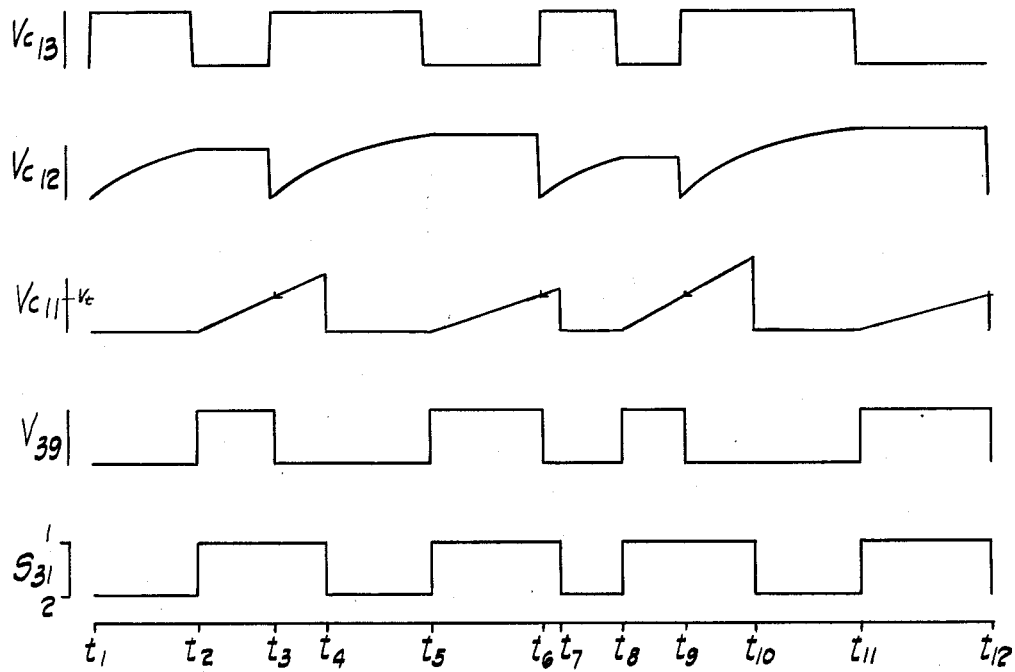
FIG. 2 illustrates a series of graphs of the circuit shown in FIG. 1.

The operation of the circuit shown in FIG. 1 can best be understood with reference to the wave forms shown in FIG. 2. Wave form $V_{C13}$ is the voltage across capacitor 13 as a function of time. Wave form $V_{C12}$ illustrates the voltage across the capacitor 12 as a function in time. Wave form $V_{C11}$ is the voltage across capacitor 11 as a function of time. Wave form $V_{39}$ illustrates the potential applied to the coil 39 of the relay 32 and wave form $S_{31}$ illustrates the first and second positions 1 and 2, respectively of switch 31 as a function of time.

Upon placing the switch 31 into the second position at time $t_1$ and as shown by the solid arrows in FIG. 1, the current from the constant current generator 14 flows through transistors 41 and 22 thereby cutting off the third transistor 23 and the relay 32. The relay 32 is in the position as shown by the solid arrows with no potential applied and capacitor 13 is rapidly charged thereby firing transistor 25 into conduction and discharging capacitor 12. The rapid charge of capacitor 13 is illustrated at time $t_1$ in FIG. 2. The time constant of resistors 45, 46, 55 and 56 and capacitor 12 cause capacitor 12 to charge from the power source means 18 with time as illustrated by graph $V_{C12}$. The recharging of capacitor 12 continues as long as the first switch means 31 is in the second position as illustrated by wave form $S_{31}$. The first switch means 31 would typically be mechanically connected to the heat sealing means 27 to move into the first position when the heater jaws are closed as shown symbolically in FIG. 3. Upon changing the first swtich 31 into the first position as shown by the phantom arrows in FIG. 1 and graph $S_{31}$ at $t_2$ in FIG. 2, the voltage at the base of transistor 41 is reduced thereby cutting off transistors 41 and 22 and firing transistor 23 into conduction. A potential is applied to relay 32, see $V_{39}$ of FIG. 2 energizing the relay into the position shown by the phantom arrows in FIG. 1. The energizing of relay 32 connects the output means 19 with the power source means 18 and disconnects capacitors 12 and 13 from the power source means 18. Capacitor 13 rapidly discharges through a resistor 57 and resistors 49, 50, 55 and 56. Capacitor 12 remains at a constant potential which is applied to the first transistor 21 of the constant generator 14 by transistors 24 and 42. The higher the potential on capacitor 12, the lower the current output of the constant current generator 14. When the first switch means 31 is first moved into the first position by the closing of the sealing means upon the plastic, the capacitor 11 begins to charge as illustrated by $V_{C11}$ between times $t_2$ and $t_4$. The charging rate of capacitor 11 shown by the slope of the graph $V_{C11}$ is determined by the current output of the constant current generator 14. The lower the current output of the constant current generator 14, the less the slope of the graph $V_{C11}$, the longer time is required for capacitor 11 to charge to a given potential to trigger transistor 41 and 22 into a conduction mode. This level is illustrated by $V_t$ and the ticks in graph $V_{C11}$ and is shown to have been reached at time $t_3$. At $t_3$, the conduction of transistor 23 is terminated and the relay 32 is deenergized to the position shown by the solid arrows in FIG. 1. The deenergizing of the relay 32 removes power to the output means 19 from the power source means 18 to end the heating cycle. The sealing means 27 opens at $t_4$ which places switch means 31 into the second position. When relay 32 is deenergized, capacitor 13 is charged by the power source means 18 which discharges capacitor 12 through transistor 25. Capacitor 12 then begins to recharge to store a charge proportional to the time since the last output to the output means 19, that is, since $t_3$. Capacitor 12 charges between $t_3$ and $t_5$ whereat switch 31 is again placed in the first position by the movement of the sealing means 27 to seal the next bag, for example. Since the charging duration between $t_3$ and $t_5$ was greater than between $t_1$ and $t_2$, the voltage on capacitor 12 is greater and thus representative of a longer time since the prior output to the output means 19. Accordingly, the current output of the constant current generator 14 is reduced to require a longer period of time $t_5$-$t_6$ to charge capacitor 11 to the trigger voltage $V_t$. This is illustrated in graph by the slope between $t_2$ and $t_4$ being greater than the slope between $t_5$ and $t_7$. The result is a heat pulse of longer duration as illustrated by the waveform $V_{39}$ of FIG. 2 between $t_5$ and $t_6$ and between $t_2$ and $t_3$. After termination of output at $t_6$, capacitor 12 begins to store a charge proportional to the time since the last output $t_6$ to the heater element 20. The time of recharge of capacitor 12 between $t_6$ and $t_8$ is shown to be short since the first switch means 31 was quickly moved into the first position at $t_8$ by the movement of the sealing means 27. Since the time since the last output to the heater element 20 is small $t_7$ to $t_8$, only a short heat pulse will be required for the heater element 20. The output of the constant current generator 14 will be high to quickly charge capacitor 11 between $t_8$ and $t_9$ to the trigger voltage $V_t$. The large slope of the charge of capacitor 11 reaches the trigger voltage $V_t$ and $t_9$ at which the power to the heater 20 is terminated and capacitor 12 begins to recharge. Capacitor 12 will continue to recharge until the switch 31 is again placed in the first position at $t_{11}$ by the movement of the sealing means 27. Consequently the constant current generator 14 produces a first magnitude of constant current for charging the first capacitor 11 and produces a second magnitude of constant current in accordance with the charge on the second capacitor 12.

The circuit of FIG. 1 considers the time duration since the prior output in order to control the power output to the heater element 20. A modification of this invention could include an integrator which is constantly dissipating charge to average the heater output over time. Both of these types of circuits are considered to be within the contemplation of this application and within the contemplation of the term output per time. The circuit shown in FIG. 1 incorporates a relay 32 to interconnect the power source 18 with the heater element 20 but it is well understood that such switch can be replaced by a solid state device such as an SCR, a triac or the like.

The duration in which the first switch 31 is in the first position is constant over time although the period of time in which the first switch 31 is in the second position is not constant. The first switch 31 will generally be controlled by some cam or sensing device connected to an apparatus such as heat sealing jaws which when activated will move at a uniform speed to switch from the first position to the second position. The duration from the second position to the first position will depend upon the speed of ancillary equipment such as counting devices and various other factors. The switch 31 can be a microswitch or a magnetic or optical switch which is connected to the motive means for moving the heat sealing element.

Figure 3:
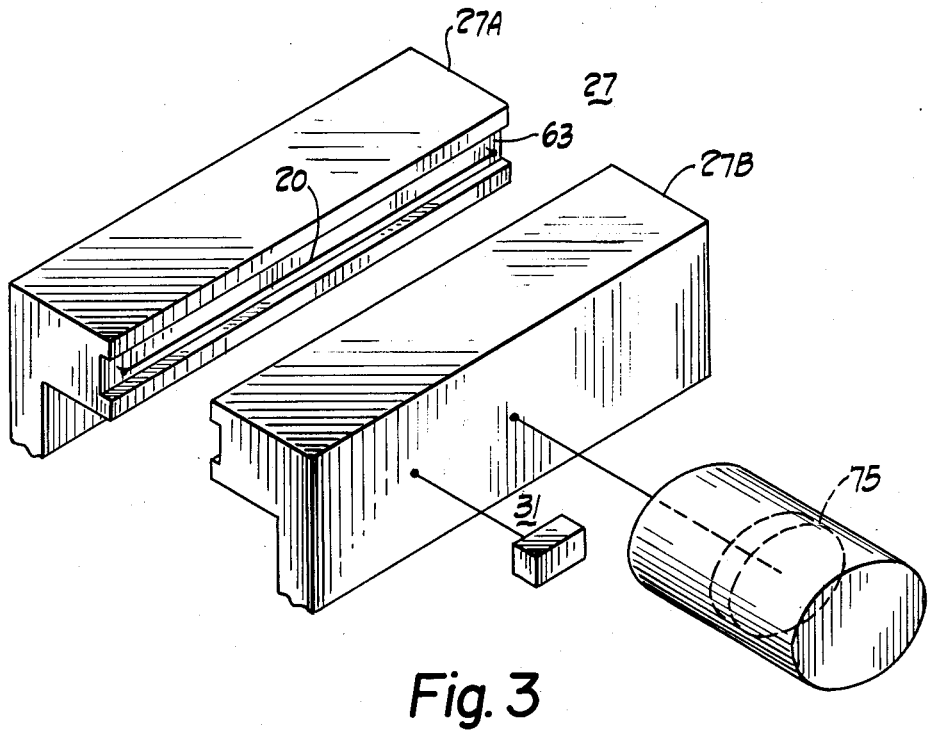
FIG. 3 illustrates a heat sealing device to seal plastic material.

FIG. 3 illustrates a sealing device useable for sealing plastic material and the like which is an application of the use of the adaptive temperature timing device shown in FIG. 1. The heater element 20 is located in a sealing means 27 which comprises a first sealer 27A and a second sealer 27B. The first sealer 27A is shown having a groove 63 wherein the heater element 20 is mounted. The heater element 20 can be a Nichrome wire or the like and may be covered by some release agent such as teflon or the like. The first and second sealing means 27A and 27B are moved by motive means which is shown schematically as a hydraulic cylinder 75. The first and second sealing means move to grasp plastic therebetween and to apply a pulse of heat to seal the plastic. The movement of the sealing means 27A and 27B can be synchronized with the position of first switch 31 as illustrated schematically in FIG. 3.

Although the adaptive timing temperature control circuit shown in FIG. 1 has been described in great deal of particularity and applied to a heat sealing device, such particulars were by way of example and not to be construed as a limitation on the device. The control circuit is suitable to control output to any output means and comprises switch means 31, first and second capacitor means 11 and 12, means for charging the second capacitor means when the switch 31 is in the second state as shown which includes the relay 32 in this embodiment. Variable current means shown at a constant current generator 14 charges the first capacitor 11 when the switch 31 is in the first position as shown by the dotted arrows. The invention also includes means connecting the second capacitor 12 to the constant current generator 14 including transistors 21 and 42 to change the output of the constant current generator in accordance with the charge on the second capacitor 12. It also shows means shown as relay 32 for controlling power to the output means 19 in accordance with the charge of the first capacitor 11. Either the first switch 31 or the relay 32 could be replaced by a solid state device, mechanical, magnetic or optical switching device.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An adaptive timing temperature control circuit to control output to output means, comprising in combination, power source means, constant current generator means adapted to provide a constant current output at various current magnitudes, means connecting said constant current generator means to said power source means to provide power for said constant current generator means, first switch means having a first and a second state, first capacitor means, means connecting said first switch means and said first capacitor means to change the charge on said first capacitor means with a first magnitude of constant current from said constant current generator means when said first switch means is in said first state, sensor means connected to said first capacitor means to produce an output when said first switch means is in said first state until the change in charge on said first capacitor means exceeds a predetermined value, means connecting said sensor means to the output means to control output thereto in accordance with the output of said sensor means, second capacitor means for storing a charge, means connected to said second capacitor means for discharging said second capacitor means upon termination of the previous output of said sensor means, means connecting said second capacitor means to said power source means to change the charge on said second capacitor means with said change in charge in said second capacitor means being in relation to the duration since the previous output of said sensor means, and means connecting said second capacitor means to said constant current generator means to provide a second current magnitude of said constant current generator means to said first capacitor means to vary the time required for said first capacitor means to have a change in charge exceeding said predetermined value whereby the duration of the output to the output means is varied in accordance with the elapsed time since the previous output thereto.

2. An adaptive timing temperature control circuit to control output to output means, comprising in combination, power source means, constant current generator means adapted to provide a constant current output at various current magnitudes, means connecting said constant current generator means to said power source means to provide power for said constant current generator means, first switch means having a first and a second state, first capacitor means, means connecting said first switch means in series with said first capacitor means and said constant current generator means to change the charge on said first capacitor means with a first magnitude of constant current from said constant current generator means when said first switch means is in said first state, Schmitt trigger means having an input and an output, means connecting said Schmitt trigger means to said power source means to provide power to said Schmitt trigger means, second switch means having energizing means, means connecting said energizing means in the output circuit of said Schmitt trigger means, means connecting said second switch means between said power source means and the output means to establish output thereto during output of said Schmitt trigger means, means connecting said input of said Schmitt trigger means to said first capacitor means to energize said second switch means when said first switch means is in said first state until the change in charge on said first capacitor means exceeds a predetermined value, second capacitor means for storing charge, means connected to said second capacitor means for discharging said second capacitor means upon termination of said second switch means being energized, means connecting said second capacitor means to said Schmitt trigger means to change the charge on said second capacitor means with said change in charge in said second capacitor means being in relation to the duration since the previous energizing of said second switch means, and means connecting the output of said second capacitor means to said constant current generator means to provide a second current magnitude of said constant generator means to said first capacitor means to vary the time required for said first capacitor means to have a change in charge exceeding said predetermined value whereby the duration of the output to the output means is varied in accordance with the elapsed time since the previous output thereto.

3. An adaptive timing temperature control circuit to control output to output means, comprising in combination:

power source means, constant current generator means adapted to provide a constant current output at various current magnitudes;

means connecting said constant current generator means to said power source means to provide power for said constant current generator means;

first switch means having a first and a second state;

first capacitor means;

means connecting said first switch means and said first capacitor means to change the charge on said first capacitor means with a first magnitude of constant current from said constant current generator means when said first switch means is in said first state;

sensor means connected to said first capacitor means to produce an output when said first switch means is in said first state until the change in charge on said first capacitor means exceeds a predetermined value to vary the time of said sensor means output inversely with said magnitude of the current of said constant current generator;

means connecting said sensor means to the output means to control output thereto in accordance with the output of said sensor means;

second capacitor means for storing charge;

means connected to said second capacitor means for discharging said second capacitor means upon termination of the previous output of said sensor means, means connecting said second capacitor means to said power source means to change the charge on said second capacitor means after said second capacitor means has been discharged with the change in charge in said second capacitor means being in relation to the duration since the previous output of said sensor means;

and means connecting said second capacitor means to said constant current generator means to vary the current magnitude of said constant current generator means providing a second magnitude of constant current for changing the charge on said first capacitor means in accordance with the change in charge on said second capacitor means whereby the duration of the output to the output means is varied in accordance with the elapsed time since the previous output thereto to compensate for heating of the output means.

4. An adaptive timing temperature control circuit to control output to output means, comprising in combination:

power source means;

constant current generator means adapted to provide a constant current output at various current magnitudes;

means connecting said constant current generator means to said power source means to provide power for said constant current generator means;

first switch means having a first and a second state;

first capacitor means;

means connecting said first switch means and said first capacitor means to change the charge on said first capacitor means with a first magnitude of constant current from said constant current generator means when said first switch means is in said first state;

sensor means connected to said first capacitor means to produce an output when said first switch means is in said first state until the change in charge on said first capacitor means exceeds a predetermined value to vary the time of said sensor means output inversely with said magnitude of the current output of said constant current generator means;

means connecting said sensor means to the output means to control output thereto in accordance with the output of said sensor means;

second capacitor means for storing charge;

transistor means having an input and an output;

means connecting said output of said transistor means across second capacitor means;

means connecting said input of said transistor means to said output of said sensor means for discharging said second capacitor means through said transistor means upon termination of the previous output of said sensor means;

means connecting said second capacitor means to said power source means to change the charge of said second capacitor means after said second capacitor means has been discharged with the change in charge in said second capacitor means being in relation to the duration since the previous output of said sensor means;

and means connecting said second capacitor means to said constant current generator means to provide a second magnitude of constant current of said constant current generator means for changing the charge on said first capacitor means to vary the time required for said first capacitor means to have a change in charge exceeding said predetermined value in accordance with the change in charge on said second capacitor means whereby the duration of the output means is varied in accordance with the elapsed time since the previous output thereto to compensate for heating of the output means.

* * * * *